United States Patent

Tubbs

(10) Patent No.: US 6,513,971 B2
(45) Date of Patent: Feb. 4, 2003

(54) HEATABLE MEMBER AND TEMPERATURE MONITOR THEREFOR

(75) Inventor: Henry Tubbs, Tetbury (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 09/987,587

(22) Filed: Nov. 15, 2001

(65) Prior Publication Data

US 2002/0064205 A1 May 30, 2002

(30) Foreign Application Priority Data

Nov. 30, 2000 (GB) .................................. 0029171

(51) Int. Cl.⁷ .............................. G01J 5/08; G01K 1/16; G01K 13/00; F02C 6/00
(52) U.S. Cl. ................. 374/144; 60/803; 415/118; 416/61; 374/121
(58) Field of Search .................. 374/131, 121, 374/144, 142; 415/118, 47; 416/61–62, 39; 60/803, 772

(56) References Cited

U.S. PATENT DOCUMENTS

| 3,348,414 A | * | 10/1967 | Waters et al. .............. 374/144 |
| 3,623,368 A | * | 11/1971 | Decker, Jr. .................. 374/144 |
| 4,184,743 A | * | 1/1980 | Baker et al. ............. 350/96.23 |
| 4,244,222 A | * | 1/1981 | Hoyer et al. .................. 73/349 |
| 4,279,153 A | * | 7/1981 | Kervistin et al. ............. 73/357 |
| 4,733,975 A | * | 3/1988 | Komanetsky et al. ........ 374/144 |
| 4,765,751 A | * | 8/1988 | Pannone et al. ............. 374/143 |
| 4,916,715 A | * | 4/1990 | Adiutori ...................... 374/29 |
| 5,306,088 A | * | 4/1994 | Zoerner ...................... 374/131 |
| 6,109,783 A | * | 8/2000 | Dobler et al. ............... 374/131 |
| 6,364,524 B1 | * | 4/2002 | Markham .................... 374/131 |

FOREIGN PATENT DOCUMENTS

| EP | 275059 A2 3 | 7/1988 |
| EP | 505147 A2 | 9/1992 |

* cited by examiner

Primary Examiner—Diego Gutierrez
Assistant Examiner—Gail Verbitsky
(74) Attorney, Agent, or Firm—W. Warren Taltavull; Manelli Denison & Selter PLLC

(57) ABSTRACT

Use of an optical fiber for the direct receipt of heat radiation for transmission to a remote pyrometer is enabled by the provision of an apertured, contaminant free compartment in the component being heated, and aligning the heat receiving end of the optical fiber with the aperture so as to receive radiated heat from within the compartment.

5 Claims, 2 Drawing Sheets

HEATABLE MEMBER AND TEMPERATURE MONITOR THEREFOR

FIELD OF THE INVENTION

The present invention relates to a sensor device that is designed for use in a hot environment, and a monitor with which to measure the temperature thereof during that use.

BACKGROUND OF THE INVENTION

The present invention has particular efficacy, but by no means restrictively so, when used in the gas turbine field.

It is known, to measure the temperature in a gas flow through a gas turbine engine turbine section. From this, the temperature of the turbine components over which the gas flows may be assessed. An example of known art is described and illustrated in published specification GB 2 248 296, wherein an optically transparent sapphire member has a thermally emissive, metal oxide layer facing its end extremity, which layer is exposed to a flow of hot gas. Heat radiated from the layer passes through the sapphire member and a fibre optic cable, to a standard pyrometer, which translates the temperature into a useable electronic signal.

All the prior art known to the applicant for a patent for the present invention, have at least one common factor, this being that that surface which radiates the heat to the pyrometer, is immersed in the high speed gas flow, and consequently the optical receiver suffers gradually reducing ability to pass heat radiation thereto. This is brought about by exposure of the optical surface to the products of combustion, including carbon particles. A further drawback that other known heat monitors will experience, is that engines now being designed and built, will operate at temperatures higher than any previously achieved, their turbine structure being composed of materials capable of operating in those higher temperatures. Such temperatures will destroy known sensors.

SUMMARY OF THE INVENTION

The present invention seeks to provide an improved combination of a heatable sensing member and a temperature monitor therefor.

Accordingly the present invention comprises, in combination, a component operable in a hot environment and including therewithin a compartment sealed against ingress of contaminates generated in the said hot environment, and a heat monitor comprising an optic fibre located outside that space volume wherein said hot environment will occur, in spaced relationship with said component and with one end extremity aligned with an aperture in said component via which during a said hot environment operation, heat conducted into the compartment via its wall is radiated to said optic fibre end extremity for transmission thereby to a remote pyrometer.

DESCRIPTION OF THE DRAWINGS

The invention will now be described, by way of example and with reference to the accompanying drawings, in which.

DETAILED DESCRIPTION OF THE INVENTION

Figure 1:
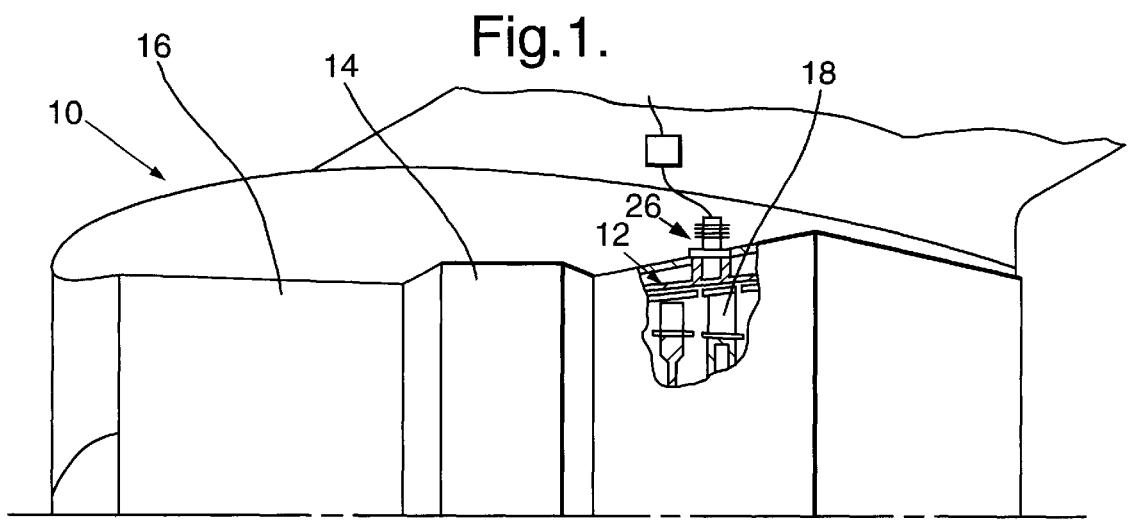
FIG. 1 is a diagrammatic part view of a gas turbine engine with part of the associated turbine section exposed so as to show the location of a component and heat monitor in accordance with one aspect of the present invention.

Referring to FIG. 1. A gas turbine engine 10 includes a turbine section 12, through which hot gases from combustion equipment within casing 14 are expanded in known manner. The gas flow is contaminated with combustion products, carbon particles and atmospheric dust that, inevitably, is sucked into the engine 10 by the compressor within casing 16.

Figure 2:
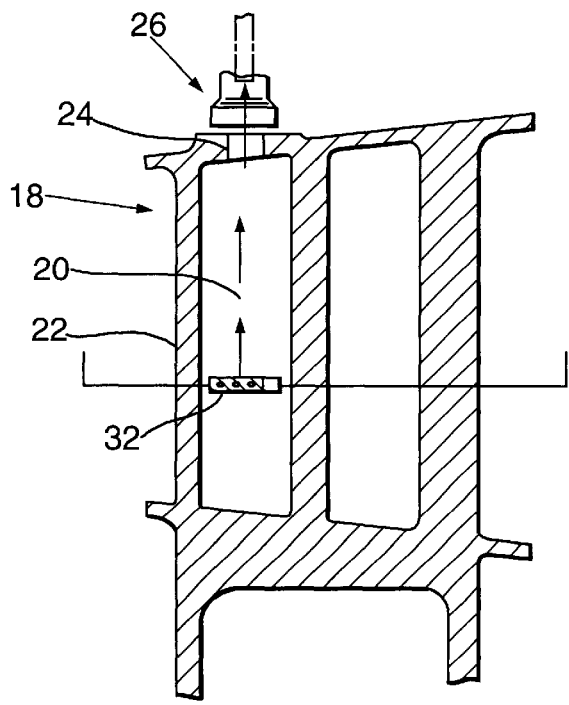
FIG. 2 is an enlarged, lengthwise cross sectional of the component, a turbine guide vane, showing said aperture.

During operation of gas turbine engine 10, it is important to monitor the temperature of the gases passing through the turbine section 14, so as to assess the operating conditions of the engine. To this end, the present invention measures the temperature of one or more of guide vanes 18, which, being soaked by the gas temperature, exhibits a closely related level of temperature thereas. The measurement is achieved by providing a compartment 20 within each guide vane 18, at a position near its leading edge 22 (FIG. 2), which compartment has an aperture 24 in its radially outer end with respect to the axis of rotation of engine 10, and fixedly positioning an optical fibre radiation transmitter 26 between a pair of casings 28 and 30 (FIG. 4) that surround the stage of guide vanes 18, so that the end extremity of the optical fibre is facing the aperture 24.

Figure 3:
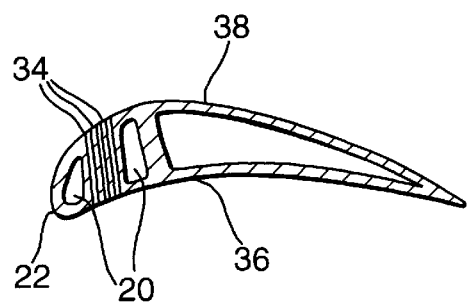
FIG. 3 is a chordal cross sectional view on line 3—3 of FIG. 2.

Compartment 20 contains a thin bridge 32, which spans the width of aperture 24 and is aligned with optical fibre 26. Passages 34 extend through bridge 32, from the pressure side 36 of the guide vane 18 to its suction side 38, as can be seen in FIG. 3. Hot gas can thus flow across vane 18, heating bridge 32 as it does so. The dimensional proportions of bridge 32 are sufficiently small, as to ensure that bridge 32 will easily attain a temperature equal to that of the gas flowing through the passages 34 therein.

It will be appreciated, however, that it is not essential that the thin bridge 32 is present. It is only necessary that the optical fibre 26 is aligned with a portion of the compartment 20 that attains an appropriate temperature.

Figure 4:
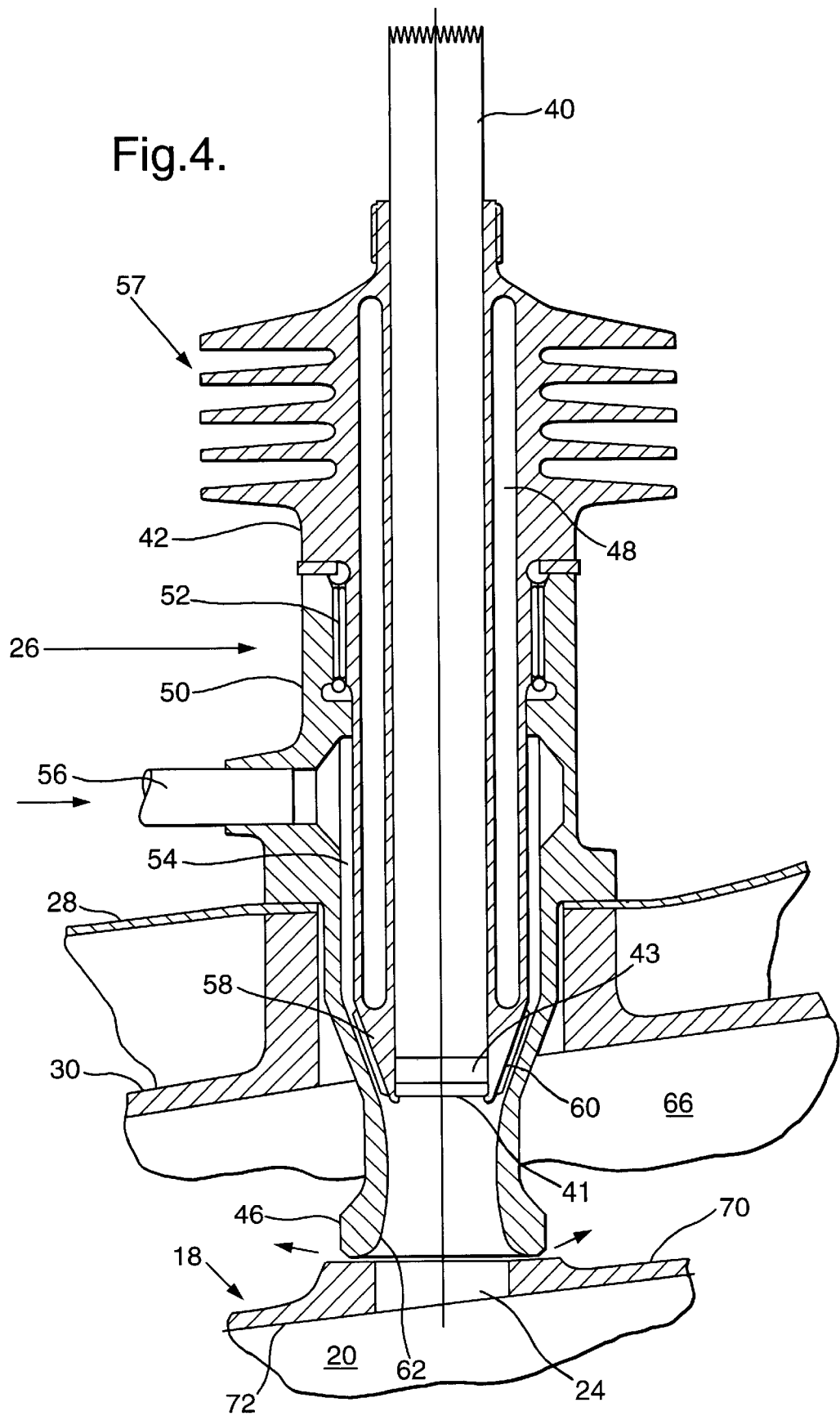
FIG. 4 is an enlarged, axial cross sectional view through the heat monitor of FIG. 1.

Referring now to FIG. 4. The optical fibre radiation transmitter 26 is constructed from an optical fibre 40 which includes a thermally emissive coated member 41 and lens 43 in known manner, fitted within a body in the form of a jacket 42. Optical fibre 40 and jacket 42 extend towards aperture 24 in guide vane 18, but their ends stop short thereof so as to allow provision of a nozzle 46 which itself, is part of a further jacket 50 and extends to a position very close to aperture 24, for reasons explained later in this specification.

Jacket 42 includes an annular compartment 48, which is filled with a cooling fluid e.g. water, for the purpose of cooling the optical fibre 40 when on engine shut down, cooling airflow stops, but engine temperature temporarily rises. Jacket 50 surrounds jacket 42 and is retained thereon by a screw threaded connection 52. Jackets 42 and 50, between them, define a further annular compartment 54. A small cooling air supply (not shown) is connectable, via a conduit 56, to compartment 54, which also serves the purpose of preventing the entry of combustion gases to the optical path by leakage. Thereafter, the cooling air exits the optical fibre radiation transmitter via nozzle 46. This cooling function is augmented by heat extracting fins 57 formed on the upper end of jacket 42, as viewed in FIG. 4.

The lower end 58 of jacket 42 and that part of jacket 50 that overlaps it are identically tapered and the tapered portion of jacket 42 has swirl vanes 60 formed thereon, so as to impart a swirling motion to the cooling air as it flows towards the outlet of nozzle 46. The swirling motion, combined with the curved shape of the interior wall surface 6 of nozzle 46, causes the airflow to adhere to wall 62, thus avoiding interference with heat radiating up the central portion of nozzle 46, onto the end face 44 of optical fibre 40, which, if it occurred, could degrade the radiation intensity, and send a false signal to a standard radiation pyrometer 64 (FIG. 1) located in a cool position remote from the engine 10.

On reaching the outlet of nozzle 46, the curved surface thereof allows the cooling air to escape in directions radially away from the nozzle axis, initially entraining any air leaving aperture 24 and thereafter, any contaminated air leaked from the gas path in which vane 20 resides. That air, contaminated or not, will thus be prevented from contacting the end face 44 of optical fibre 40, and is dispersed in an annular space 66, which is defined by the turbine casing 30, and the outer platforms 70 of the guide vanes 18, the inner surfaces 72 of which, along with other known cylindrical structures (not shown) 15 define the outer boundary of the gas annulus in known manner.

The skilled man, having read this specification, will realise that the present invention protects the optical path from exposure to hot high velocity gas comprising combustion products, carbon particles and airborne dirt. He will further appreciate that that the present invention obviates the need for the provision of a dedicated airflow across the face of the radiation receiver, and regular maintenance to clean it. Moreover, whilst the present invention is described and illustrated in connection with a gas turbine engine, the skilled man will appreciate that the radiation transmitter 26 can be used in any component wherein the provision of a suitable compartment corresponding to compartment 20 is possible, whether it be an operating powerplant, or a manufacturing process for e.g. a heat treatment process, or a metal melting or alloy forming process.

What is claimed is:

1. In combination, a component operable in a hot environment and including therewithin a compartment sealed against ingress of contaminates generated in the said hot environment, and a heat monitor comprising an optic fibre located outside a space volume wherein said hot environment will occur, in spaced relationship with said component and with one end extremity aligned with an aperture in said component via which, during said hot environment operation, heat conducted into the compartment via a compartment wall is radiated directly to said optic fibre end extremity for transmission thereby to a remote pyrometer.

2. The combination as claimed in claim 1 wherein said component comprises a gas turbine engine turbine guide vane having a radially outer platform and a leading edge, said compartment comprises a hollowed out portion within the leading edge of said guide vane, with respect to the direction of flow of hot gases thereover, during operation in said gas turbine engine, and said aperture is in the radially outer platform of said guide vane, with respect to the axis of rotation of said gas turbine engine, when said guide vane is installed therein.

3. The combination as claimed in claim 2 including a bridge which spans the internal width of said compartment and is in alignment with said optical fibre for the purpose of radiating heat thereto via said aperture.

4. The combination as claimed in claim 3 wherein said bridge has passages therethrough which extend from a pressure side of said guide vane to a suction side thereof so as to enable direct heating of said bridge by hot gas during operation of said gas turbine engine.

5. A gas turbine engine including the combination claimed in claim 1 wherein said optical fibre is connectable to the pyrometer remote from the heat to be monitored, for the purpose of transmitting received heat thereto for conversion to usable electronic signals.

* * * * *